(12) United States Patent
Hirai et al.

(10) Patent No.: US 11,660,570 B2
(45) Date of Patent: May 30, 2023

(54) CATALYST ARRANGEMENT DECIDING METHOD FOR FLUE GAS DENITRIZER, MAINTENANCE METHOD FOR FLUE GAS DENITRIZER, FLUE GAS DENITRIZER, BOILER, AND POWER GENERATION PLANT

(71) Applicant: MITSUBISHI HEAVY INDUSTRIES, LTD., Tokyo (JP)

(72) Inventors: Tsuyoshi Hirai, Yokohama (JP); Tsuyoshi Yamaguchi, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/588,898

(22) Filed: Jan. 31, 2022

(65) Prior Publication Data
US 2022/0274059 A1 Sep. 1, 2022

(30) Foreign Application Priority Data
Feb. 26, 2021 (JP) .............................. JP2021-029696

(51) Int. Cl.
*B01D 53/86* (2006.01)
*B01D 53/90* (2006.01)

(52) U.S. Cl.
CPC ..... *B01D 53/8696* (2013.01); *B01D 53/8625* (2013.01); *B01D 53/90* (2013.01); *B01D 2251/2062* (2013.01); *B01D 2255/902* (2013.01); *B01D 2255/904* (2013.01); *B01D 2257/404* (2013.01); *B01D 2258/0283* (2013.01)

(58) Field of Classification Search
CPC ................ B01D 53/8696; B01D 53/90; B01D 53/8625; B01D 2258/0283; B01D 2255/902; B01D 2255/904; B01D 2257/404; B01D 2251/2062; B01J 38/00; B01J 2219/00225; B01J 2219/00247; B01J 2219/00252; G05B 1/00; G05D 21/00; G05D 2201/00
See application file for complete search history.

(56) References Cited

U.S. PATENT DOCUMENTS 4,142,989 A * 3/1979 Kohama ................... B01J 8/18
423/239.1
5,820,693 A * 10/1998 Patchett ............... B01J 37/0215
134/22.12
(Continued)

FOREIGN PATENT DOCUMENTS

EP         159 959 A  * 10/1985  ......... B01D 53/8625
JP     2017 215 083 A  * 12/2017  ......... B01D 53/8696
(Continued)

*Primary Examiner* — Timothy C Vanoy
(74) *Attorney, Agent, or Firm* — WHDA, LLP

(57) ABSTRACT

A catalyst arrangement deciding method for a flue gas denitrizer including a catalyst layer disposed in an exhaust gas passage includes: a step of investigating a location dependence of a degradation state of a catalyst in the catalyst layer after a lapse of a period of operation; and a step of deciding a first region of the catalyst layer in which a first catalyst is used and a second region of the catalyst layer in which a second catalyst different from the first catalyst is used, on the basis of the location dependence.

16 Claims, 7 Drawing Sheets

(56) References Cited

U.S. PATENT DOCUMENTS

| | | | | |
|---|---|---|---|---|
| 5,882,422 | A * | 3/1999 | Obayashi | B01J 37/34 134/1 |
| 6,025,292 | A * | 2/2000 | Obayashi | B01D 53/8625 502/22 |
| 2010/0100404 | A1* | 4/2010 | Hodges | C10G 7/12 706/54 |
| 2010/0326052 | A1* | 12/2010 | Sun | B01D 53/9495 60/274 |
| 2013/0071296 | A1* | 3/2013 | Harada | B01D 53/885 422/170 |
| 2018/0185834 | A1* | 7/2018 | Masuda | B01D 53/96 |
| 2019/0076783 | A1* | 3/2019 | Davidson | B01D 53/26 |

FOREIGN PATENT DOCUMENTS

| | | | | |
|---|---|---|---|---|
| JP | 6768092 | B2 | 10/2020 | |
| WO | WO 2004 043 575 | A1 * | 5/2004 | B01D 53/56 |

* cited by examiner

CATALYST ARRANGEMENT DECIDING METHOD FOR FLUE GAS DENITRIZER, MAINTENANCE METHOD FOR FLUE GAS DENITRIZER, FLUE GAS DENITRIZER, BOILER, AND POWER GENERATION PLANT

TECHNICAL FIELD

The present disclosure relates to a catalyst arrangement deciding method for a flue gas denitrizer, a maintenance method for a flue gas denitrizer, a flue gas denitrizer, a boiler, and a power generation plant.

BACKGROUND

Nitrogen oxides (NOx) contained in exhaust gas from combustion facilities such as power generation boilers, gas turbines, and combustion furnaces may be removed or reduced by decomposing them into harmless nitrogen and water using a reductant in the presence of a denitration catalyst.

For example, Patent Document 1 discloses a flue gas denitrizer for removing nitrogen oxides in exhaust gas from a pulverized coal-fired boiler. This flue gas denitrizer has a plurality of denitration catalyst layers disposed in an exhaust gas passage through which the exhaust gas from the pulverized coal-fired boiler flows. Among the plurality of denitration catalyst layers, a denitration catalyst layer disposed on the upstream side of the exhaust gas flow is composed of a plate-shaped catalyst (plate catalyst), and a denitration catalyst layer disposed on the downstream side of the exhaust gas flow is composed of a honeycomb-shaped catalyst (honeycomb catalyst).

CITATION LIST

Patent Literature

Patent Document 1: JP6768092B

SUMMARY

Each of the denitration catalyst layers disposed in the exhaust gas passage is usually composed of a single type of catalyst (e.g., plate catalyst or honeycomb catalyst). If the performance and function of the flue gas denitrizer deteriorates over the operation period of the combustion facility, the facility including the flue gas denitrizer is stopped, and the catalyst constituting the catalyst layer is replaced with an unused catalyst of the same type in order to maintain the performance and function of the flue gas denitrizer. There are two types of catalyst replacement: replacement of the whole catalyst that forms the catalyst layer, or replacement of only part of the catalyst whose performance and function have deteriorated relatively significantly. However, when trying to maintain the performance and function of the flue gas denitrizer by replacement with the same catalyst, the performance and function of only part of the catalyst constituting the catalyst layer tends to deteriorate and the replacement frequency of the part of the catalyst tends to be relatively high, so it is difficult to use the flue gas denitrizer continuously for a long term.

In view of the above, an object of at least one embodiment of the present invention is to provide a catalyst arrangement deciding method for a flue gas denitrizer and a maintenance method for a flue gas denitrizer whereby it is possible to continuously use the flue gas denitrizer for a long term.

A catalyst arrangement deciding method for a flue gas denitrizer according to at least one embodiment of the present invention is a method for a flue gas denitrizer including a catalyst layer disposed in an exhaust gas passage and comprises: a step of investigating a location dependence of a degradation state of a catalyst in the catalyst layer after a lapse of a period of operation; and a step of deciding a first region of the catalyst layer in which a first catalyst is used and a second region of the catalyst layer in which a second catalyst different from the first catalyst is used, on the basis of the location dependence.

Further, a maintenance method for a flue gas denitrizer according to at least one embodiment of the present invention comprises a step of replacing at least part of the catalyst constituting the catalyst layer with the first catalyst or the second catalyst so that the first catalyst is arranged in the first region, and the second catalyst is arranged in the second region decided by the above-described catalyst arrangement deciding method.

Further, a catalyst arrangement deciding method for a flue gas denitrizer according to at least one embodiment of the present invention is a method for a flue gas denitrizer disposed in an exhaust gas passage, and comprises: a step of investigating, after a lapse of a period of operation of a plant provided with an investigation flue gas denitrizer different from the flue gas denitrizer, a location dependence of a degradation state of a catalyst in a catalyst layer of the investigation flue gas denitrizer; and a step of deciding a first region of a catalyst layer of the flue gas denitrizer in which a first catalyst is used and a second region of the catalyst layer of the flue gas denitrizer in which a second catalyst different from the first catalyst is used, on the basis of the location dependence.

At least one embodiment of the present invention provides a catalyst arrangement deciding method for a flue gas denitrizer and a maintenance method for a flue gas denitrizer whereby it is possible to continuously use the flue gas denitrizer for a long term.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

(Configuration of Combustion Facility and Flue Gas Denitrizer)

Figure 1:
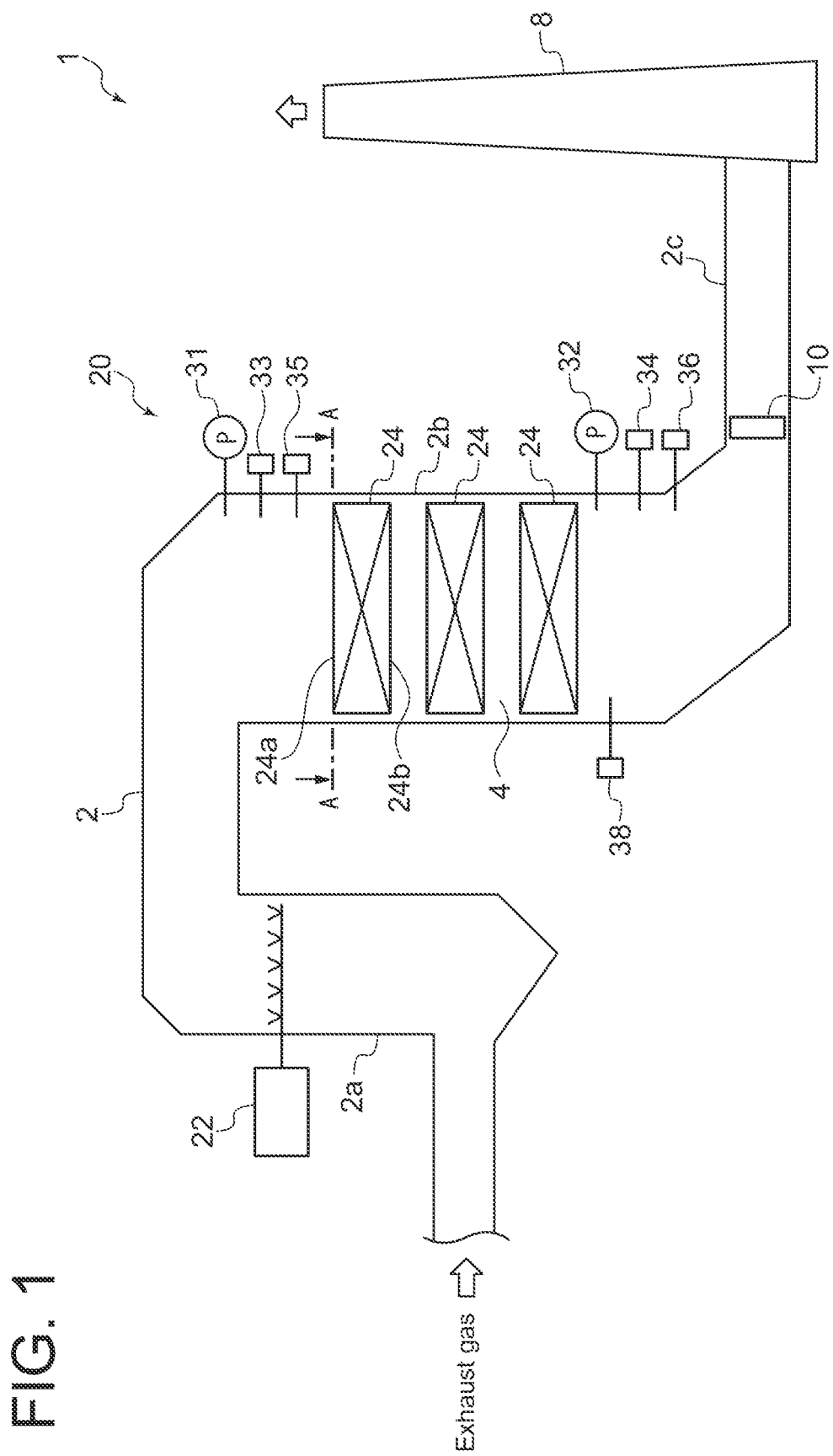
FIG. 1 is a schematic configuration diagram of a combustion facility including a flue gas denitrizer to which a catalyst arrangement deciding method according to an embodiment is applied.
Figure 2:
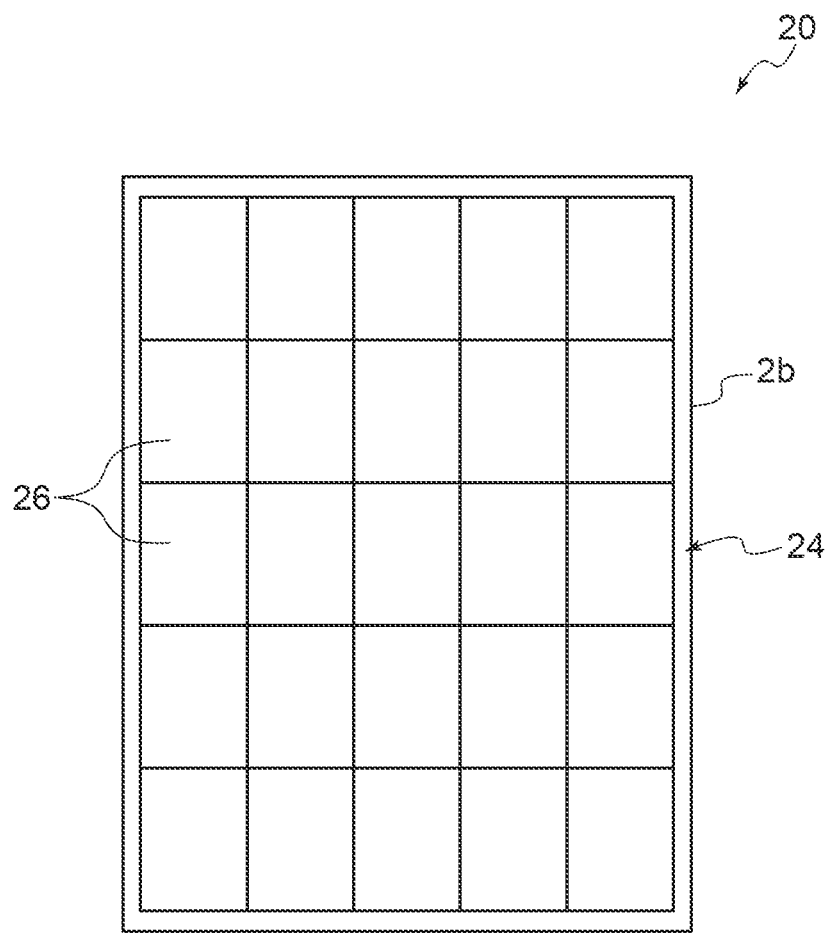
FIG. 2 is a cross-sectional view taken along line A-A in FIG. 1.

FIG. 1 is a schematic configuration diagram of a combustion facility including a flue gas denitrizer to which a catalyst arrangement deciding method according to some embodiments is applied. FIG. 2 is a cross-sectional view taken along line A-A in FIG. 1.

As shown in FIG. 1, the combustion facility 1 includes a flue gas duct (duct) 2 to which exhaust gas from a combustion furnace (not shown) for combusting fuel such as coal is introduced, and a flue gas denitrizer 20 for removing or reducing nitrogen oxides (NOx) from the exhaust gas flowing through the flue gas duct 2. A heat transfer tube (not shown) may be provided inside the flue gas duct 2 at a position upstream of the flue gas denitrizer 20, and a fluid (e.g., water or steam) supplied to the heat transfer tube may be heated by heat exchange between the fluid and the exhaust gas. The exhaust gas having passed through the heat transfer tube may flow into the flue gas denitrizer 20. The fluid (e.g., steam) heated in the heat transfer tube may drive a generator. That is, the combustion facility 1 may be a boiler constituting a power generation plant.

The exhaust gas from which nitrogen oxides have been removed or reduced by the flue gas denitrizer 20 is discharged to the outside through a downstream portion 2c of the flue gas duct 2, which is located downstream of the flue gas denitrizer 20, and a stack 8 connected to the downstream portion 2c. The downstream portion 2c of the flue gas duct 2 may be provided with a heater 10 for heating a fluid (e.g., air) using the exhaust gas flowing through the downstream portion 2c as the heat source. Further, the downstream portion 2c of the flue gas duct 2 may be provided with a device for removing or reducing sulfur oxides (SOx) and soot such as combustion ash contained in the exhaust gas.

The flue gas denitrizer 20 includes a reductant supply part 22 for supplying a reductant (reducing agent) into the flue gas duct 2 and at least one catalyst layer 24 disposed downstream of the reductant supply part 22 in the flue gas duct 2. In the exemplary embodiment shown in FIG. 1, the flue gas denitrizer 20 includes three catalyst layers 24.

The reductant supply part 22 is configured to supply a reductant having an effect of reducing nitrogen oxides in the exhaust gas to an exhaust gas passage 4 formed by a first portion 2a of the flue gas duct 2. The reductant may include ammonia, aqueous ammonia, or aqueous urea. The reductant supply part 22 may be configured to supply a reductant in the form of droplet or gas to the flue gas duct 2.

The catalyst layer 24 includes a catalyst 26 (see FIG. 2) for promoting the reaction between the reductant and nitrogen oxides in the exhaust gas. The catalyst layer 24 is disposed in an exhaust gas passage 4 formed by a second portion 2b of the flue gas duct 2 downstream of the first portion 2a with respect to the exhaust gas flow. Each catalyst layer 24 is disposed so as to extend along a plane perpendicular to the exhaust gas flow direction (or a plane perpendicular to the extension direction of the second portion 2b of the flue gas duct 2). When the exhaust gas passage 4 has a plurality of catalyst layers 24, the catalyst layers 24 are arranged along the exhaust gas flow direction in the exhaust gas passage 4. Each of the catalyst layers 24 is supported to the second portion 2b of the flue gas duct 2 by a support member (not shown).

As shown in FIG. 2, the catalyst layer 24 includes a plurality of catalysts (catalyst modules) 26 arranged along a plane perpendicular to the exhaust gas flow direction (or a plane perpendicular to the extension direction of the second portion 2b). Each catalyst 26 includes a carrier and a catalytic component supported by the carrier. The catalytic component is a substance that promotes the reaction between the reductant and nitrogen oxides, and may include, for example, vanadium and tungsten.

Each of the catalyst layers 24 has an upstream end 24a and a downstream end 24b which are opposite ends in the exhaust gas flow direction. The exhaust gas flowing through the exhaust gas passage 4 flows into the catalyst layer 24 via the upstream end 24a of the catalyst layer 24, passes through the catalyst 26, and then flows out of the catalyst layer 24 via the downstream end 24b.

Figure 3:
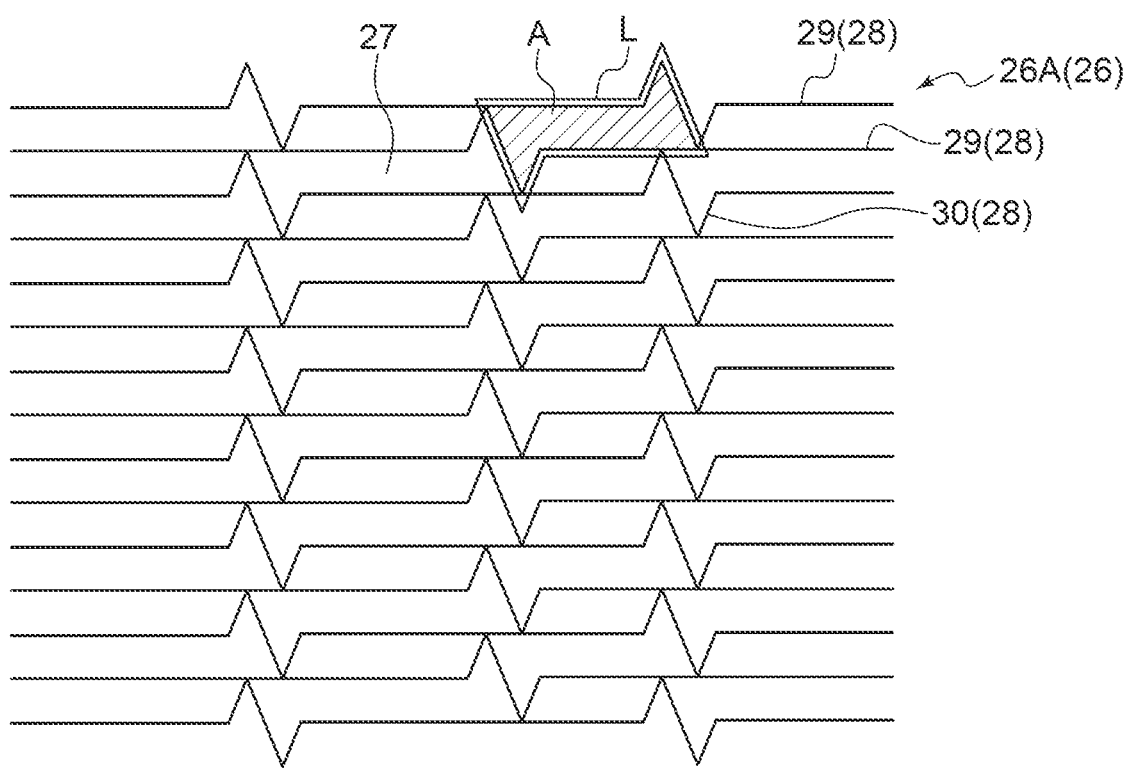
FIG. 3 is a partial cross-sectional view of a catalyst constituting a catalyst layer according to an embodiment.
Figure 4:
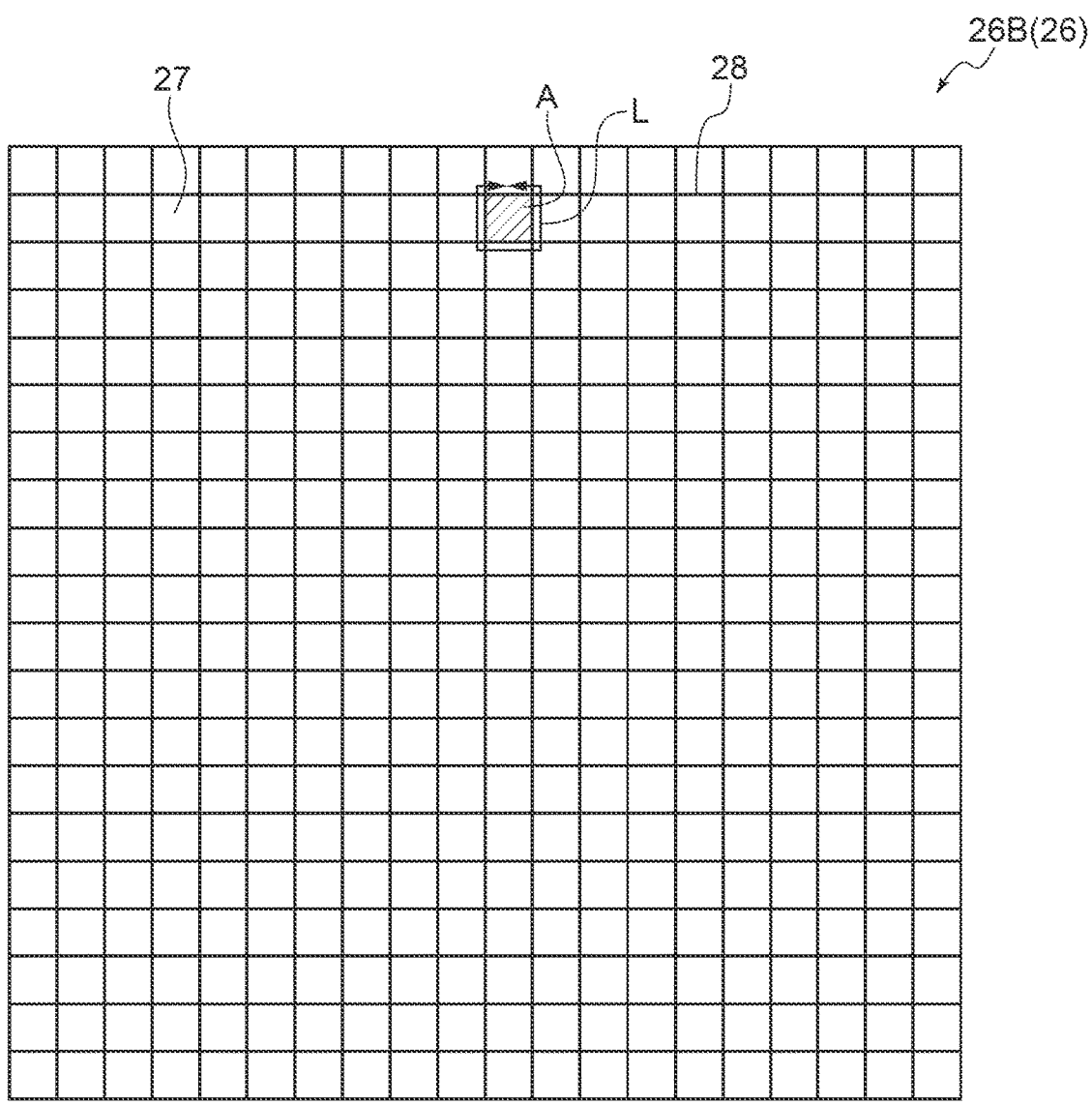
FIG. 4 is a partial cross-sectional view of a catalyst constituting a catalyst layer according to an embodiment.

FIGS. 3 and 4 are each a partial cross-sectional view of the catalyst 26 constituting the catalyst layer 24 according to an embodiment. The catalyst 26 shown in FIG. 3 is a plate-shaped catalyst 26A, and the catalyst 26 shown in FIG. 4 is a honeycomb catalyst 26B. These cross-sectional views show the cross-section of the catalyst 26 perpendicular to the exhaust gas flow direction.

Each catalyst 26 has a plurality of cells 27 extending along the exhaust gas flow direction. Both end portions of the cells 27 in the exhaust gas flow direction are open. Accordingly, the exhaust gas flowing through the exhaust gas passage 4 can pass through each of the cells 27.

As shown in FIGS. 3 and 4, the cells 27 may be formed by a carrier 28.

The carrier 28 of the plate-shaped catalyst 26A shown in FIG. 3 includes a plurality of plate portions 29 disposed substantially parallel to each other and support portions 30 disposed between each pair of adjacent plate portions 29 for supporting the plate portions 29 in the state where a distance is kept between the pair of plate portions 29. In the plate-shaped catalyst 26A shown in FIG. 3, the cell 27 is formed as a space defined by the plate portions 29 and the support portions 30.

The honeycomb catalyst 26B shown in FIG. 4 has a honeycomb structure formed by the carrier 28. In the exemplary embodiment shown in FIG. 4, the carrier 28 of the honeycomb catalyst 26B has a grid shape in a cross-section perpendicular to the exhaust gas flow direction. In the honeycomb catalyst 26B shown in FIG. 4, the cell 27 is formed as a space defined by the honeycomb structure formed by the carrier 28.

In FIGS. 3 and 4, L represents the perimeter of the cell 27, and A represents the flow-passage cross-sectional area of the cell 27 in a cross-section perpendicular to the exhaust gas flow direction. The hydraulic diameter of the cell 27 can be expressed as $(4 \times A)/L$.

The plate-shaped catalyst is characterized by relatively low pressure drop and relatively excellent wear resistance. In contrast, the honeycomb catalyst is characterized by relatively high denitration performance per unit volume.

As shown in FIG. 1, the flue gas denitrizer 20 further includes a first pressure measuring part 31, a second pressure measuring part 32, a first NOx concentration measuring part 33, a second NOx concentration measuring part 34, a first SOx concentration measuring part 35, a second SOx concentration measuring part 36, and a reductant concentration measuring part 38.

The first pressure measuring part 31 is configured to measure the pressure inside the flue gas duct 2 at a position upstream of the catalyst layer 24. The second pressure measuring part 32 is configured to measure the pressure inside the flue gas duct 2 at a position downstream of the catalyst layer 24. The first NOx concentration measuring part 33 is configured to measure the concentration of NOx (nitrogen oxides) inside the flue gas duct 2 at a position upstream of the catalyst layer 24. The second NOx concentration measuring part 34 is configured to measure the concentration of NOx inside the flue gas duct 2 at a position downstream of the catalyst layer 24. The first SOx concentration measuring part 35 is configured to measure the concentration of $SO_3$ (sulfur trioxide) inside the flue gas duct 2 at a position upstream of the catalyst layer 24 by the precipitation titration method. The second SOx concentration measuring part 36 is configured to measure the concentration of $SO_3$ inside the flue gas duct 2 at a position downstream of the catalyst layer 24 by the precipitation titration method. The reductant concentration measuring part 38 is configured to measure the concentration of the reductant (e.g., ammonia) inside the flue gas duct 2 at a position downstream of the catalyst layer 24.

The first pressure measuring part 31 may be configured to measure the pressure at multiple first positions in a flow passage cross-section of the flue gas duct 2 upstream of the catalyst layer 24. The second pressure measuring part 32 may be configured to measure the pressure at multiple second positions in a flow passage cross-section of the flue gas duct 2 downstream of the catalyst layer 24. In other words, each of the first pressure measuring part 31 or the second pressure measuring part 32 may be configured to measure the in-plane distribution of pressure in the flue gas duct 2. Each of the second positions corresponds to each of the first positions.

The first NOx concentration measuring part 33 may be configured to measure the concentration of NOx (nitrogen oxides; $NO_2$, NO, etc.) at multiple thirds positions in a flow passage cross-section of the flue gas duct 2 upstream of the catalyst layer 24. The second NOx concentration measuring part 34 may be configured to measure the concentration of NOx at multiple fourth positions in a flow passage cross-section of the flue gas duct 2 downstream of the catalyst layer 24. Each of the fourth positions corresponds to each of the third positions.

The first SOx concentration measuring part 35 may be configured to measure the concentration of $SO_3$ at multiple fifth positions in a flow passage cross-section of the flue gas duct 2 upstream of the catalyst layer 24. The second SOx concentration measuring part 36 may be configured to measure the concentration of $SO_3$ at multiple sixth positions in a flow passage cross-section of the flue gas duct 2 downstream of the catalyst layer 24. Each of the sixth positions corresponds to each of the fifth positions.

The reductant concentration measuring part 38 may be configured to measure the concentration of the reductant at multiple seventh positions in a flow passage cross-section of the flue gas duct 2 downstream of the catalyst layer 24. When ammonia is used as the reductant, the reductant concentration measuring part 38 is configured to measure the concentration of ammonia inside the flue gas duct 2.

(Catalyst Arrangement Deciding Method and Maintenance Method for Flue Gas Denitrizer)

Figure 5:
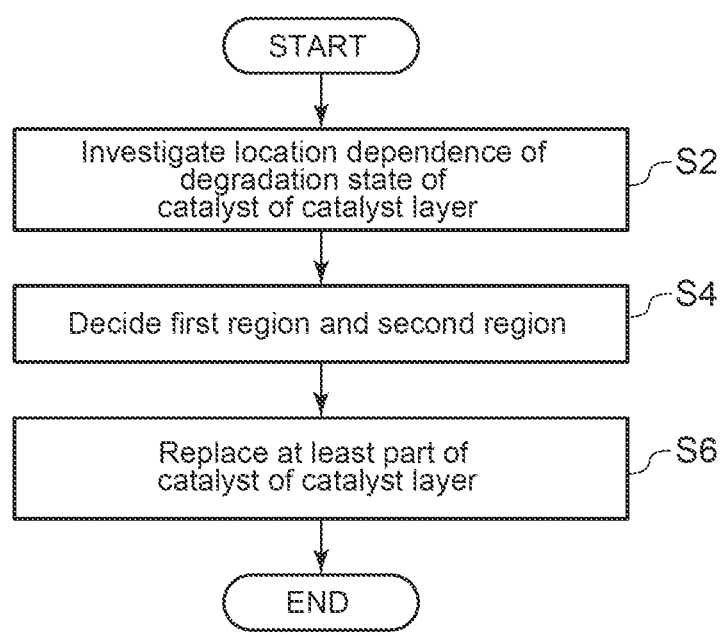
FIG. 5 is a flowchart of the catalyst arrangement deciding method and the maintenance method for a flue gas denitrizer according to an embodiment.
Figure 6:
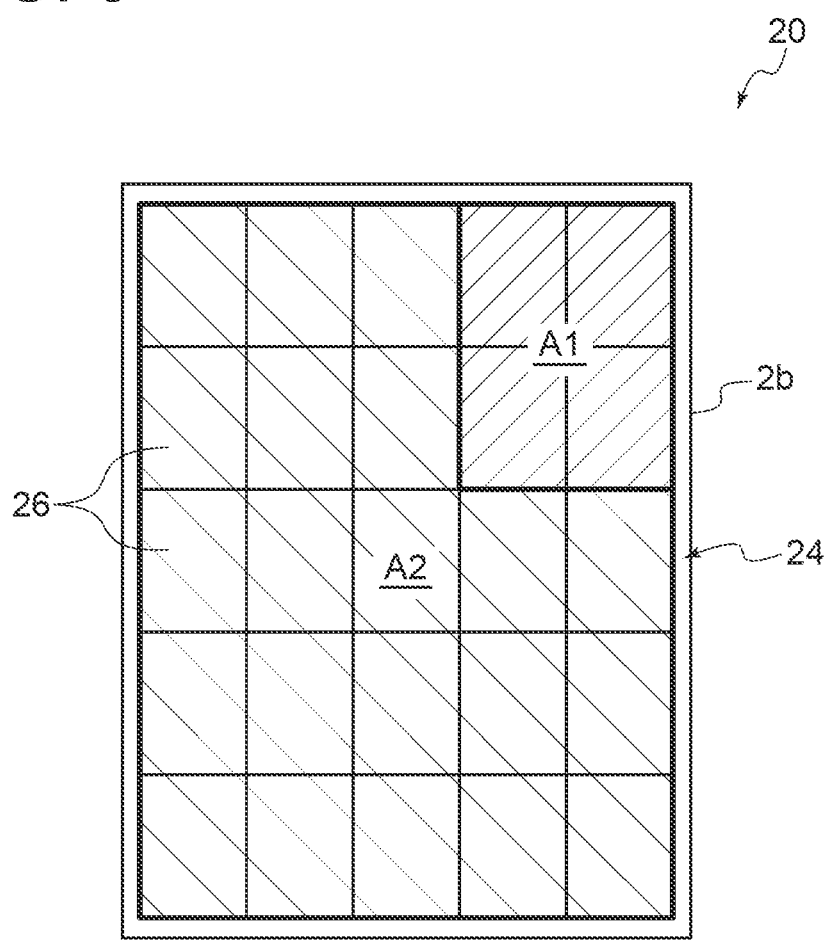
FIG. 6 is a diagram for describing the catalyst arrangement deciding method according to an embodiment.

Hereinafter, the catalyst arrangement deciding method and the maintenance method for a flue gas denitrizer according to some embodiments will be described. In the following, the flue gas denitrizer 20 included in the combustion facility 1 is the maintenance target. FIG. 5 is a flowchart of the catalyst arrangement deciding method and the maintenance method for a flue gas denitrizer according to an embodiment. FIG. 6 is a diagram for describing the catalyst arrangement deciding method according to an embodiment.

As shown in FIG. 5, in some embodiments, the first region and the second region of the catalyst layer 24 are decided according to the catalyst arrangement deciding method according to an embodiment (S2 to S4), and part of the catalyst 26 constituting the catalyst layer 24 is replaced with the first catalyst or the second catalyst so that the first catalyst is arranged in the first region and the second catalyst is arranged in the second region thus decided (S6).

In step S2, after the lapse of a period of operation of the flue gas denitrizer 20 (i.e., after the lapse of a period of operation of the combustion facility 1 including the flue gas denitrizer 20), the location dependence of the degradation state of the catalyst 26 in the catalyst layer 24 of the flue gas denitrizer 20 is investigated.

The progress of catalyst degradation varies depending on the flow velocity, temperature, pressure, composition, concentration of particles such as combustion ash of exhaust gas, or distribution thereof in the exhaust gas passage where the catalyst is arranged. Thus, the degradation state (the degree of progress of degradation) of the catalyst 26 varies depending on the location in the catalyst layer 24. By investigating the location dependence of the degradation state of the catalyst 26 in the catalyst layer 24 in step S2 as described above, it is possible to identify the region of the catalyst layer 24 where the degradation of the catalyst 26 relatively proceeds and the region where the degradation does not relatively proceed.

The investigation of the location dependence of the degradation state of the catalyst 26 in step S2 may be performed by directly inspecting the catalyst 26 of the catalyst layer 24 while the combustion facility 1 is stopped, or may be performed on the basis of measurement data acquired during the operation of the combustion facility 1.

In step S4, on the basis of the investigation result of the location dependence of the degradation state of the catalyst 26 in step S2, the first region of the catalyst layer 24 in which the first catalyst is used and the second region of the catalyst layer 24 in which the second catalyst different from the first catalyst is used are decided. As exemplified below, the first catalyst and the second catalyst differ in at least one of the catalyst structure (shape, dimension, etc.), characteristic required as the catalyst (durability, ash passage, pressure loss, wear resistance, etc.), and catalyst performance. The first region and the second region are regions different from each other in the degradation state of the catalyst 26. One of the first region and the second region is a region where the catalyst 26 more significantly degrades or a region where the catalyst 26 is more likely to degrade than in the other region. The first region and the second region may be set so as not to overlap each other in a plane perpendicular to the exhaust gas flow direction (or the second portion 2b of the flue gas duct 2), for example as shown in FIG. 6. In FIG. 6, the region A1 is the first region, and the region A2 is the second region. By arranging one of the first catalyst and the second catalyst which is less likely to degrade in one of the first region and the second region where the degradation is likely to proceed and the other catalyst in the other region, the progress of degradation of the catalyst can be suppressed as a whole of the catalyst layer 24.

In the flue gas denitrizer 20 including the catalyst layer 24 composed of the catalyst 26, a specific event associated with the degradation of the catalyst 26 (e.g., catalyst wear or deposition of combustion ash on the catalyst) is likely to occur in a specific region of the catalyst layer 24. The ease of occurrence and progress of such an event varies depending on the type of catalyst. In this regard, according to the method including steps S2 to S4, the location dependence of the degradation state of the catalyst 26 in the catalyst layer 24 is investigated, and the first region and the second region of the catalyst layer 24 respectively using the first catalyst and the second catalyst different from each other are decided on the basis of the location dependence. Therefore, if the first catalyst and the second catalyst are appropriately selected, the occurrence and progress of the event associated with the catalyst degradation can be suppressed by arranging the first catalyst and the second catalyst in the catalyst layer according to the decision. Thus, the reduction in performance or function of the flue gas denitrizer 20 can be suppressed, and the flue gas denitrizer 20 can be used continuously for a longer term.

More specifically, steps S2 to S4 can be performed as follows.

In an embodiment, in step S2, the location dependence of the wear state of the catalyst 26 in the catalyst layer 24 is investigated as the degradation state of the catalyst 26. In this investigation, for example, the region where wear of the catalyst 26 is relatively advanced in the catalyst layer 24 and the region where wear of the catalyst 26 is not relatively advanced are identified. Then, in step S4, on the basis of the investigation of the location dependence in step S2, the region where wear is relatively advanced in the catalyst layer 24 is decided as the first region in which the first catalyst is used, and the region where wear is not relatively advanced is decided as the second region in which the second catalyst is used. The first catalyst has greater resistance to wear than the second catalyst.

The investigation of the location dependence of the wear state of the catalyst 26 may be performed by visually inspecting each of the catalysts 26 constituting the catalyst layer 24 while the combustion facility 1 is stopped. In this case, as a result of the visual inspection, the region containing the catalyst 26 in which a through hole is detected in the carrier 28 may be identified as the region where wear of the catalyst is relatively advanced.

Alternatively, the investigation of the location dependence of the wear state of the catalyst 26 may be performed by measuring the dimension of a wear portion of each of the catalysts 26 constituting the catalyst layer 24 while the combustion facility 1 is stopped. In this case, as a result of the dimension measurement, the region containing the catalyst 26 in which wear or reduction of 100 mm or more in depth from the upstream end 24a toward the downstream end 24b is detected may be identified as the region where wear of the catalyst is relatively advanced.

In an embodiment, in step S2, the location dependence of the ash deposition state on the catalyst 26 is investigated as the degradation state of the catalyst 26. In this investigation, for example, the region where ash deposition on the catalyst 26 is relatively advanced in the catalyst layer 24 and the region where ash deposition is not relatively advanced are identified. Then, in step S4, on the basis of the investigation of the location dependence in step S2, the region where ash deposition on the catalyst 26 is relatively advanced in the catalyst layer 24 is decided as the first region in which the first catalyst is used, and the region where ash deposition on the catalyst 26 is not relatively advanced is decided as the second region in which the second catalyst is used. The first catalyst is less likely to deposit ash than the second catalyst.

In the combustion facility 1, ash (combustion ash) is produced together with the combustion gas by combustion of fuel. Part of ash accumulates in the lower portion of the combustion furnace and is discharged outside the combustion furnace through an ash discharge portion. Part of ash is introduced to the flue gas duct 2 as fly ash, accompanied by the combustion gas. Thus, as the ash enters the flue gas duct 2 together with the exhaust gas, it may accumulate on the catalyst 26 arranged inside the flue gas duct 2.

The investigation of the location dependence of the ash deposition state on the catalyst 26 may be performed by visually inspecting each of the catalysts 26 constituting the catalyst layer 24 while the combustion facility 1 is stopped. In this case, as a result of the visual inspection, the region containing the catalyst 26 where the clogged flow passage area (e.g., the proportion of cells 27 that are clogged) is a predetermined percentage, e.g., 50% or more of the total when viewed in the exhaust gas flow direction may be identified as the region where ash deposition on the catalyst is relatively advanced.

Alternatively, the investigation of the location dependence of the ash deposition state on the catalyst 26 may be performed by measuring the pressure inside the flue gas duct 2 during the operation of the combustion facility 1. In this case, the pressure is measured at the multiple first positions and the multiple second positions corresponding to the multiple first positions by the first pressure measuring part 31 and the second pressure measuring part 32. Further, the region containing the position where the difference between the pressure measurement value by the first pressure measuring part 31 and the pressure measurement value by the second pressure measuring part 32 is equal to or more than a specified value may be identified as the region where ash deposition on the catalyst is relatively advanced. Alternatively, the region containing the position where the increase rate of the difference (pressure drop) between the pressure measurement value by the first pressure measuring part 31 and the pressure measurement value by the second pressure measuring part 32 is equal to or more than a specified value (for example, the pressure difference increases by 10% or more in a specified period of a few days to a few months) may be identified as the region where ash deposition on the catalyst is relatively advanced.

In an embodiment, in step S2, the location dependence of the performance reduction of the catalyst 26 in the catalyst layer 24 is investigated as the degradation state of the catalyst 26. In this investigation, for example, the region where the performance of the catalyst 26 is insufficient in the catalyst layer 24 and the region where the performance of the catalyst 26 is sufficient are identified. Then, in step S4, on the basis of the investigation of the location dependence in step S2, the region where the performance of the catalyst 26 is insufficient in the catalyst layer 24 is decided as the second region in which the second catalyst is used, and the region where the performance of the catalyst 26 is sufficient is decided as the first region in which the first catalyst is used. The second catalyst has higher catalytic performance per unit volume than the first catalyst.

The investigation of the location dependence of the performance reduction of the catalyst 26 may be performed by examining the catalytic performance of each of the catalysts 26 constituting the catalyst layer 24 while the combustion facility 1 is stopped. In this case, the region containing the catalyst 26 in which a catalytic performance index obtained by examining the catalyst performance is less than a specified value may be identified as the region where the catalytic performance is insufficient.

In an embodiment, in step S2, the location dependence of the reductant leakage amount, denitration rate, or $SO_2$ (sulfur dioxide) oxidation rate in the catalyst layer 24 is investigated as an index of the degradation state of the catalyst 26. The reductant leakage amount, denitration rate, or $SO_2$ oxidation rate also functions as an index of the catalytic performance.

The reductant leakage amount is expressed as the concentration of the reductant (e.g., ammonia) at a position downstream of the catalyst layer 24 in the exhaust gas flow direction. The denitration rate is expressed as a ratio of the concentration of NOx (nitrogen oxides) at a position downstream of the catalyst layer 24 in the exhaust gas flow direction to the concentration of NOx (nitrogen oxides) at a position upstream of the catalyst layer 24 in the exhaust gas flow direction. The $SO_2$ oxidation rate is expressed as a ratio of the concentration of $SO_3$ (sulfur trioxide) at a position downstream of the catalyst layer 24 in the exhaust gas flow direction to the concentration of $SO_3$ at a position upstream of the catalyst layer 24 in the exhaust gas flow direction.

The NOx concentration can be measured according to JIS K 0104 by using a chemiluminescent NOx meter (JIS B 7982) or by a zinc reduction naphthylethylenediamine absorptiometry (Zn-NEDA method).

When the reductant leakage amount is used as an index of the degradation state of the catalyst, in step S4, on the basis of the investigation of the location dependence in step S2, the region where the reductant leakage amount is relatively large in the catalyst layer 24 is decided as the second region in which the second catalyst is used, and the region where the reductant leakage amount is relatively small is decided as the first region in which the first catalyst is used.

The investigation of the location dependence of the reductant leakage amount may be performed by measuring the reductant concentration inside the flue gas duct 2 during the operation of the combustion facility 1. In this case, the reductant concentration (in-plane distribution of the reductant concentration downstream of the catalyst layer 24) at the multiple seventh positions is measured by the reductant concentration measuring part 38. Further, among the multiple seventh positions, the region containing the catalyst 26 corresponding to the position where the measurement value by the reductant concentration measuring part 38 is equal to or more than a specified value (e.g., 3 ppm) may be identified as the region where the reductant leakage amount is relatively large.

The concentration of ammonia ($NH_3$) as the reductant can be measured according to JIS K 0099 by the ion chromatograph method.

When the denitration rate is used as an index of the degradation state of the catalyst, in step S4, on the basis of the investigation of the location dependence in step S2, the region where the denitration rate is relatively small in the catalyst layer 24 is decided as the second region in which the second catalyst is used, and the region where the denitration rate is relatively large is decided as the first region in which the first catalyst is used.

The investigation of the location dependence of the denitration rate may be performed by measuring the NOx concentration inside the flue gas duct 2 during the operation of the combustion facility 1. In this case, the NOx concentration at the multiple third positions is measured by the first NOx concentration measuring part 33, and the NOx concentration at the multiple fourth positions is measured by the second NOx concentration measuring part 34. Further, the denitration rate at each position is calculated based on measurement values of the NOx concentration at the third and fourth positions corresponding to each other. Further, the region containing the catalyst 26 corresponding to the position where the denitration rate thus calculated is equal to or less than a specified value may be identified as the region where the denitration rate is relatively small.

When the $SO_2$ oxidation rate is used as an index of the degradation state of the catalyst, in step S4, on the basis of the investigation of the location dependence in step S2, the region where the $SO_2$ oxidation rate is relatively large in the catalyst layer 24 is decided as the second region in which the second catalyst is used, and the region where the $SO_2$ oxidation rate is relatively small is decided as the first region in which the first catalyst is used.

The investigation of the location dependence of the $SO_2$ oxidation rate may be performed by measuring the $SO_3$ concentration inside the flue gas duct 2 during the operation of the combustion facility 1. In this case, the $SO_3$ concentration at the multiple fifth positions is measured by the first SOx concentration measuring part 35, and the $SO_3$ concentration at the multiple sixth positions is measured by the second SOx concentration measuring part 36. Further, the $SO_2$ oxidation rate at each position is calculated based on measurement values of the $SO_3$ concentration at the fifth and sixth positions corresponding to each other. Further, the region containing the catalyst 26 corresponding to the position where the $SO_2$ oxidation rate thus calculated is equal to or more than a specified value may be identified as the region where the $SO_2$ oxidation rate is relatively large.

In some embodiments, the hydraulic diameter of the cell 27 (see FIGS. 3 and 4) of the first catalyst is larger than that of the second catalyst. The hydraulic diameter of the cell 27 of the catalyst can be expressed as $(4 \times A)/L$, where L is the perimeter of the cell 27, and A is the flow passage cross-sectional area of the cell 27.

The ease of occurrence and progress of a specific event associated with the catalyst degradation varies depending on the structure of the catalyst, for example, the hydraulic diameter of the cell formed by the carrier of the catalyst. As described above, by arranging the first catalyst and the second catalyst different in the hydraulic diameter of the cell 27 in the first region and the second region, respectively, as decided in steps S2 to S4, the occurrence and progress of the event associated with the catalyst degradation can be effectively suppressed. Thus, the reduction in performance or function of the flue gas denitrizer 20 can be suppressed, and the flue gas denitrizer 20 can be used continuously for a longer term.

In some embodiments, the first catalyst is a plate-shaped catalyst 26A, and the second catalyst is a honeycomb catalyst 26B.

The ease of occurrence and progress of a specific event associated with the catalyst degradation varies depending on the structure of the catalyst, for example, varies between a plate-shaped catalyst and a honeycomb catalyst. In the above-described embodiment, since the plate-shaped catalyst 26A is used as the first catalyst, and the honeycomb catalyst 26B is used as the second catalyst, by arranging the first catalyst (plate-shaped catalyst 26A) and the second catalyst (honeycomb catalyst 26B) in the first region and the second region, respectively, as decided in steps S2 to S4, the occurrence and progress of the event associated with the catalyst degradation can be effectively suppressed.

In step S6, at least part of the catalyst 26 constituting the catalyst layer 24 is replaced with the first catalyst or the second catalyst so that the first catalyst is arranged in the first region and the second catalyst is arranged in the second region decided in steps S2 to S4.

The following describes the case where the first region and the second region are decided by steps S2 to S4 for a catalyst layer 24 composed of only the honeycomb catalyst 26B, and a plate-shaped catalyst is used as the first catalyst and a honeycomb catalyst as the second catalyst. In this case, in step S6, each catalyst 26 (honeycomb catalyst 26B) disposed in the first region is replaced with the plate-shaped catalyst 26A as the first catalyst. For the catalyst 26 (honeycomb catalyst 26B) disposed in the second region, the existing honeycomb catalyst 26B may continue to be used as the second catalyst, or all or part of the existing honeycomb catalyst 26B may be replaced with an unused honeycomb catalyst 26B.

Thus, since at least part of the catalyst 26 constituting the catalyst layer 24 with the first catalyst or the second catalyst so that the first catalyst is arranged in the first region and the second catalyst is arranged in the second region decided by step S2 to S4, the occurrence and progress of the event associated with the catalyst degradation can be suppressed.

In the above-described embodiment, the catalyst arrangement in the flue gas denitrizer 20 of the combustion facility 1 is decided on the basis of operational experience in the combustion facility 1, but in other embodiments, the catalyst arrangement in a flue gas denitrizer 20 of a combustion facility (e.g., a new combustion facility to be installed) different from an existing combustion facility may be decided on the basis of operational experience of the existing combustion facility. Hereinafter, the latter embodiment will be described.

Figure 7:
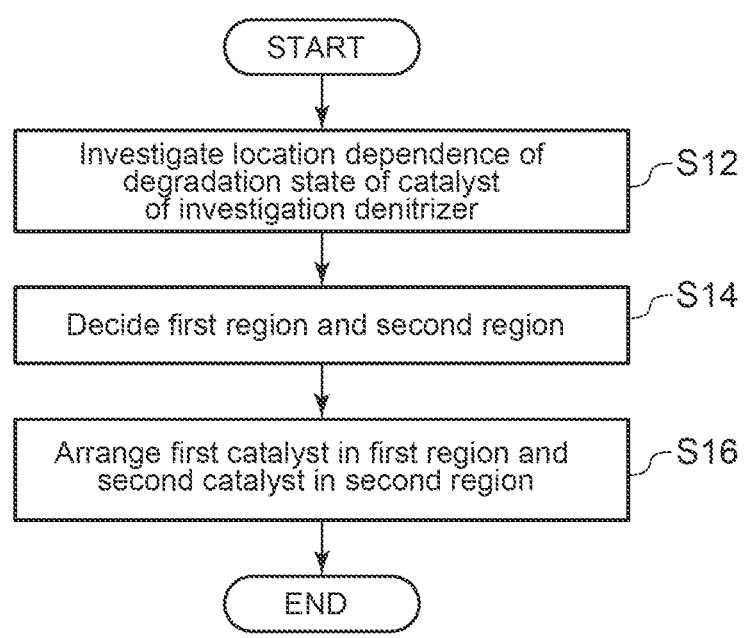
FIG. 7 is a flowchart of the catalyst arrangement deciding method for a flue gas denitrizer according to an embodiment.

FIG. 7 is a flowchart of the catalyst arrangement deciding method for a flue gas denitrizer according to an embodiment.

As shown in FIG. 7, in an embodiment, first, after the lapse of a period of operation of a flue gas denitrizer 20 of an existing first combustion facility (i.e., after the lapse of a period of operation of a first combustion facility including an investigation flue gas denitrizer), the location dependence of the degradation state of the catalyst 26 in the catalyst layer 24 of the flue gas denitrizer 20 (investigation flue gas denitrizer) is investigated. The method of investigating the location dependence of the degradation state of the catalyst 26 is the same as in step S2.

Then, in step S14, on the basis of the investigation result of the location dependence of the degradation state of the catalyst 26 in step S12, the region suitable for using the first catalyst and the region suitable for using the second catalyst different from the first catalyst are decided in the catalyst layer 24 of the flue gas denitrizer 20 (investigation flue gas denitrizer) of the first combustion facility. Further, for a catalyst layer 24 of a flue gas denitrizer 20 of a second combustion facility different from the first combustion facility, the first region corresponding to the region suitable for using the first catalyst and the second region corresponding to the region suitable for using the second catalyst are decided.

Then, in step S16, in the catalyst layer 24 of the flue gas denitrizer of the second combustion facility, the first catalyst is arranged in the first region decided in steps S12 to S14, and the second catalyst is arranged in the second region decided in steps S12 to S14.

According to the above-described embodiments, the location dependence of the degradation state of the catalyst 26 in the catalyst layer 24 of the investigation flue gas denitrizer is investigated, and the first region and the second region of the catalyst layer 24 of the flue gas denitrizer 20 different from the investigation flue gas denitrizer are decided on the basis of the location dependence. In other words, even for a flue gas denitrizer 20 in a new plant (second combustion facility) without operational experience, the first region and the second region can be decided on the basis of operational experience of an existing investigation flue gas denitrizer.

Therefore, even in a new plant, the occurrence and progress of the event associated with the catalyst degradation can be suppressed by arranging the first catalyst and the second catalyst in the first region and the second region, respectively, as decided as described above. Thus, the reduction in performance or function of the flue gas denitrizer 20 can be suppressed, and the flue gas denitrizer can be used continuously for a longer term.

The contents described in the above embodiments would be understood as follows, for instance.

(1) A catalyst arrangement deciding method for a flue gas denitrizer according to at least one embodiment of the present invention is a catalyst arrangement deciding method for a flue gas denitrizer (20) including a catalyst layer (24) disposed in an exhaust gas passage, comprising: a step (S2) of investigating a location dependence of a degradation state of a catalyst (26) in the catalyst layer after the lapse of a period of operation; and a step (S4) of deciding a first region of the catalyst layer in which a first catalyst is used and a second region of the catalyst layer in which a second catalyst different from the first catalyst is used, on the basis of the location dependence.

In the flue gas denitrizer including the catalyst layer composed of the catalyst, a specific event associated with the degradation of the catalyst (e.g., catalyst wear or deposition of combustion ash on the catalyst) is likely to occur in a specific region of the catalyst layer. The ease of occurrence and progress of such an event varies depending on the type of catalyst. In this regard, according to the above method (1), the location dependence of the degradation state of the catalyst in the catalyst layer is investigated, and the first region and the second region of the catalyst layer respectively using the first catalyst and the second catalyst different from each other are decided on the basis of the location dependence. Therefore, if the first catalyst and the second catalyst are appropriately selected, the occurrence and progress of the event associated with the catalyst degradation can be suppressed by arranging the first catalyst and the second catalyst in the catalyst layer according to the decision. Thus, the reduction in performance or function of the flue gas denitrizer can be suppressed, and the flue gas denitrizer can be used continuously for a longer term.

(2) In some embodiments, in the above method (1), each of the first catalyst and the second catalyst has a cell (27) extending along an exhaust gas flow direction, and a hydraulic diameter of the cell of the first catalyst is larger than a hydraulic diameter of the cell of the second catalyst.

The ease of occurrence and progress of a specific event associated with the catalyst degradation varies depending on the structure of the catalyst, for example, the hydraulic diameter of the cell formed by the carrier of the catalyst. According to the above method (2), since the first catalyst and the second catalyst different in the hydraulic diameter of the cell formed by the carrier are used, by arranging the first catalyst and the second catalyst in the first region and the second region, respectively, as decided by the method (1), the occurrence and progress of the event associated with the catalyst degradation can be effectively suppressed. Thus, the reduction in performance or function of the flue gas denitrizer can be suppressed, and the flue gas denitrizer can be used continuously for a longer term.

(3) In some embodiments, in the above method (1) or (2), the first catalyst is a plate-shaped catalyst (26A), and the second catalyst is a honeycomb catalyst (26B).

The ease of occurrence and progress of a specific event associated with the catalyst degradation varies depending on the structure of the catalyst, for example, varies between a plate-shaped catalyst and a honeycomb catalyst. According to the above method (3), since the plate-shaped catalyst is used as the first catalyst, and the honeycomb catalyst is used as the second catalyst, by arranging the first catalyst (plate-shaped catalyst) and the second catalyst (honeycomb catalyst) in the first region and the second region, respectively, as decided by the above method (1), the occurrence and progress of the event associated with the catalyst degradation can be effectively suppressed. Thus, the reduction in performance or function of the flue gas denitrizer can be suppressed, and the flue gas denitrizer can be used continuously for a longer term.

(4) In some embodiments, in any one of the above methods (1) to (3), the investigating step includes investigating a location dependence of a wear state of the catalyst, an ash deposition state on the catalyst, a performance reduction of the catalyst, or a reductant leakage amount from the catalyst as the degradation state.

According to the above method (2), the location dependence of a wear state of the catalyst, an ash deposition state on the catalyst, a performance reduction of the catalyst, or a reductant leakage amount from the catalyst as the degradation state is investigated. Thus, the first region and the second region of the catalyst layer respectively using the first catalyst and the second catalyst different from each other can be appropriately decided on the basis of the investigation result of the local dependence. Thus, the catalyst degradation can be suppressed by arranging the first catalyst and the second catalyst in the catalyst layer according to the decision. Thus, the reduction in performance or function of the flue gas denitrizer can be suppressed, and the flue gas denitrizer can be used continuously for a longer term.

(5) In some embodiments, in the above method (4), the investigating step includes investigating the location dependence of the wear state of the catalyst as the degradation state, and the first region is a region where wear of the catalyst is more advanced than in the second region.

According to the above method (5), since the first catalyst is arranged in the first region where wear of the catalyst is relatively advanced, and the second catalyst is arranged in the second region where wear of the catalyst is not relatively advanced, by adopting a catalyst which is relatively hard to wear as the first catalyst, it is possible to effectively suppress wear of the catalyst in the first region. Thus, the reduction in performance or function of the flue gas denitrizer can be effectively suppressed, and the flue gas denitrizer can be used continuously for a longer term.

(6) In some embodiments, in the above method (4), the investigating step includes investigating the location dependence of the ash deposition state on the catalyst as the degradation state, and the first region is a region where an area in which the catalyst is clogged is larger than in the second region when viewed in an exhaust gas flow direction.

According to the above method (6), since the first catalyst is arranged in the first region where ash deposition on the catalyst and clogging of the catalyst are relatively advanced, and the second catalyst is arranged in the second region where ash deposition on the catalyst and clogging of the catalyst are not relatively advanced, by adopting a catalyst which is relatively less likely to deposit ash as the first catalyst, it is possible to effectively suppress ash deposition on the catalyst in the first region. Thus, the reduction in performance or function of the flue gas denitrizer can be effectively suppressed, and the flue gas denitrizer can be used continuously for a longer term.

(7) In some embodiments, in the above method (4), the investigating step includes investigating the location dependence of the performance reduction of the catalyst as the degradation state, and the second region is a region where performance of the catalyst is lower than in the first region.

According to the above method (7), since the second catalyst is arranged in the second region where the performance reduction of the catalyst is relatively advanced, and the first catalyst is arranged in the first region where the performance reduction of the catalyst is not relatively advanced, by adopting a catalyst which has relatively high catalytic performance (denitration performance) per unit volume as the second catalyst, it is possible to improve the catalytic performance with the same volume.

(8) In some embodiments, in the above method (4), the investigating step includes investigating the location dependence of the reductant leakage amount as the degradation state, and the second region is a region where the reductant leakage amount is larger than in the first region.

According to the above method (8), since the second catalyst is arranged in the second region where the reductant leakage amount is relatively large, and the first catalyst is arranged in the first region where the reductant leakage amount is relatively small, by adopting a catalyst which has relatively high catalytic performance (denitration performance) per unit volume as the second catalyst, it is possible to effectively reduce the reductant leakage amount in the second region. Thus, the reduction in performance or function of the flue gas denitrizer can be effectively suppressed, and the flue gas denitrizer can be used continuously for a longer term.

(9) A maintenance method for a flue gas denitrizer according to at least one embodiment of the present invention comprises a step (S6) of replacing at least part of the catalyst constituting the catalyst layer with the first catalyst or the second catalyst so that the first catalyst is arranged in the first region, and the second catalyst is arranged in the second region decided by the catalyst arrangement deciding method described in any one of the above (1) to (8).

According to the above method (9), since at least part of the catalyst constituting the catalyst layer with the first catalyst or the second catalyst so that the first catalyst is arranged in the first region and the second catalyst is arranged in the second region decided by the above method (1), the occurrence and progress of the event associated with the catalyst degradation can be suppressed. Thus, the reduction in performance or function of the flue gas denitrizer can be suppressed, and the flue gas denitrizer can be used continuously for a longer term.

(10) A catalyst arrangement deciding method for a flue gas denitrizer according to at least one embodiment of the present invention is a catalyst arrangement deciding method for a flue gas denitrizer disposed in an exhaust gas passage, comprising: a step of investigating, after the lapse of a period of operation of a plant provided with an investigation flue gas denitrizer different from the flue gas denitrizer, a location dependence of a degradation state of a catalyst in a catalyst layer of the investigation flue gas denitrizer; and a step of deciding a first region of a catalyst layer of the flue gas denitrizer in which a first catalyst is used and a second region of the catalyst layer of the flue gas denitrizer in which a second catalyst different from the first catalyst is used, on the basis of the location dependence.

In the above method (10), the location dependence of the degradation state of the catalyst in the catalyst layer of the investigation flue gas denitrizer is investigated, and the first region and the second region of the catalyst layer of the flue gas denitrizer different from the investigation flue gas denitrizer are decided on the basis of the location dependence. In other words, even for a flue gas denitrizer in a new plant without operational experience, the first region and the second region can be decided on the basis of operational experience of an existing investigation flue gas denitrizer. Therefore, according to the above operating method (10), even in a new plant, the occurrence and progress of the event associated with the catalyst degradation can be suppressed by arranging the first catalyst and the second catalyst in the first region and the second region, respectively, decided as described above. Thus, the reduction in performance or function of the flue gas denitrizer can be suppressed, and the flue gas denitrizer can be used continuously for a longer term.

(11) A flue gas denitrizer according to at least one embodiment of the present invention comprises a catalyst layer disposed in an exhaust gas passage, and the catalyst layer includes a first region of the catalyst layer in which a first catalyst is used and a second region of the catalyst layer in which a second catalyst different from the first catalyst is used, as decided on the basis of a location dependence of a degradation state of a catalyst in the catalyst layer after the lapse of a period of operation.

According to the above configuration (11), the location dependence of the degradation state of the catalyst in the catalyst layer is investigated, and the first region and the second region of the catalyst layer respectively using the first catalyst and the second catalyst different from each other are decided on the basis of the location dependence. Therefore, if the first catalyst and the second catalyst are appropriately selected, the occurrence and progress of the event associated with the catalyst degradation can be suppressed by arranging the first catalyst and the second catalyst in the catalyst layer according to the decision. Thus, the reduction in performance or function of the flue gas denitrizer can be suppressed, and the flue gas denitrizer can be used continuously for a longer term.

(12) A boiler according to at least one embodiment of the present invention comprises: a combustion device for combusting a fuel; an exhaust gas passage to which an exhaust gas from the combustion device is introduced; and the flue gas denitrizer described in the above (11) including a catalyst layer disposed in the exhaust gas passage.

(13) A power generation plant according to at least one embodiment of the present invention comprises: the boiler described in the above (12), and a generator configured to be driven by steam produced by the boiler.

(14) A flue gas denitrizer according to at least one embodiment of the present invention comprises a catalyst layer disposed in an exhaust gas passage, and the catalyst layer includes a first region of the catalyst layer in which a first catalyst is used and a second region of the catalyst layer in which a second catalyst different from the first catalyst is used, as decided on the basis of a location dependence of a degradation state of a catalyst in a catalyst layer of an investigation flue gas denitrizer after the lapse of a period of operation of a plant provided with the investigation flue gas denitrizer different from the flue gas denitrizer.

In the above configuration (14), the location dependence of the degradation state of the catalyst in the catalyst layer of the investigation flue gas denitrizer is investigated, and the first region and the second region of the catalyst layer of the flue gas denitrizer different from the investigation flue gas denitrizer are decided on the basis of the location dependence. In other words, even for a flue gas denitrizer in a new plant without operational experience, the first region and the second region can be decided on the basis of operational experience of an existing investigation flue gas denitrizer. Therefore, according to the above configuration (14), even in a new plant, the occurrence and progress of the event associated with the catalyst degradation can be suppressed by arranging the first catalyst and the second catalyst in the first region and the second region, respectively, decided as described above. Thus, the reduction in performance or function of the flue gas denitrizer can be suppressed, and the flue gas denitrizer can be used continuously for a longer term.

(15) A boiler according to at least one embodiment of the present invention comprises: a combustion device for combusting a fuel; an exhaust gas passage to which an exhaust gas from the combustion device is introduced; and a flue gas denitrizer described in the above (14) including a catalyst layer disposed in the exhaust gas passage.

(16) A power generation plant according to at least one embodiment of the present invention comprises: the boiler described in the above (15), and a generator configured to be driven by steam produced by the boiler.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", and "have" are not intended to be exclusive of other components.

The invention claimed is:

1. A catalyst arrangement deciding method for a flue gas denitrizer including a catalyst layer disposed in an exhaust gas passage, comprising:
a step of investigating a location dependence in a plane perpendicular to an exhaust gas flow direction, of a degradation state of a catalyst in the catalyst layer after a lapse of a period of operation; and
a step of deciding a first region of the catalyst layer in which a first catalyst is used and a second region of the catalyst layer in which a second catalyst different from the first catalyst is used, on the basis of the location dependence,
wherein the first region and the second region are different regions from each other in the plane.

2. The catalyst arrangement deciding method according to claim 1,
wherein each of the first catalyst and the second catalyst has a cell extending along an exhaust gas flow direction, and wherein a hydraulic diameter of the cell of the first catalyst is larger than a hydraulic diameter of the cell of the second catalyst.

3. The catalyst arrangement deciding method according to claim 1,
wherein the first catalyst is a plate-shaped catalyst, and
wherein the second catalyst is a honeycomb catalyst.

4. The catalyst arrangement deciding method according to claim 1,
wherein the investigating step includes investigating a location dependence of a wear state of the catalyst, an ash deposition state on the catalyst, a performance reduction of the catalyst, or a reductant leakage amount from the catalyst as the degradation state.

5. The catalyst arrangement deciding method according to claim 4,
wherein the investigating step includes investigating the location dependence of the performance reduction of the catalyst as the degradation state, and
wherein the second region is a region where performance of the catalyst is lower than in the first region.

6. The catalyst arrangement deciding method according to claim 4,
wherein the investigating step includes investigating the location dependence of the reductant leakage amount as the degradation state, and
wherein the second region is a region where the reductant leakage amount is larger than in the first region.

7. A catalyst arrangement deciding method for a flue gas denitrizer including a catalyst layer disposed in an exhaust gas passage, comprising:
a step of investigating a location dependence of a degradation state of a catalyst in the catalyst layer after a lapse of a period of operation; and
a step of deciding a first region of the catalyst layer in which a first catalyst is used and a second region of the catalyst layer in which a second catalyst different from the first catalyst is used, on the basis of the location dependence,
wherein the investigating step includes investigating the location dependence of the wear state of the catalyst as the degradation state, and
wherein the first region is a region where wear of the catalyst is more advanced than in the second region.

8. A catalyst arrangement deciding method for a flue gas denitrizer including a catalyst layer disposed in an exhaust gas, comprising:
a step of investigating a location dependence of a degradation state of a catalyst in the catalyst layer after a lapse of a period of operation; and
a step of deciding a first region of the catalyst layer in which a first catalyst is used and a second region of the catalyst layer in which a second catalyst different from the first catalyst is used, on the basis of the location dependence,
wherein the investigating step includes investigating the location dependence of the ash deposition state on the catalyst as the degradation state, and
wherein the first region is a region where an area in which the catalyst is clogged is larger than in the second region when viewed in an exhaust gas flow direction.

9. A maintenance method for a flue gas denitrizer including a catalyst layer disposed in an exhaust gas passage, comprising:
a step of investigating a location dependence of a degradation state of a catalyst in the catalyst layer after a lapse of a period of operation;

a step of deciding a first region of the catalyst layer in which a first catalyst is used and a second region of the catalyst layer in which a second catalyst different from the first catalyst is used, on the basis of the location dependence;
a step of replacing at least part of the catalyst constituting the catalyst layer with the first catalyst or the second catalyst so that the first catalyst is arranged in the first region, and the second catalyst is arranged in the second region decided by the catalyst arrangement deciding in the step of deciding the first region and the second region.

10. A catalyst arrangement deciding method for a flue gas denitrizer disposed in an exhaust gas passage, comprising:
a step of investigating, after a lapse of a period of operation of a first combustion facility provided with a first flue gas denitrizer, a location dependence in a plane perpendicular to an exhaust gas flow direction, of a degradation state of a catalyst in a catalyst layer of the first flue gas denitrizer; and
a step of deciding a first region of a catalyst layer of a second flue gas denitrizer in which a first catalyst is used and a second region of the catalyst layer of the second flue gas denitrizer in which a second catalyst different from the first catalyst is used, on the basis of the location dependence,
wherein the second flue gas denitrizer is disposed in a second combustion facility which is different from the first combustion facility, and
wherein the first region and the second region are different regions from each other in a plane perpendicular to an exhaust gas flow direction in the second flue gas denitrizer.

11. A flue gas denitrizer, comprising a catalyst layer disposed in an exhaust gas passage,
wherein the catalyst layer includes a first region of the catalyst layer in which a first catalyst is used and a second region of the catalyst layer in which a second catalyst different from the first catalyst is used, the first region and the second region being decided on the basis of a location dependence in a plane perpendicular to an exhaust gas flow direction, of a degradation state of a catalyst in the catalyst layer after a lapse of a period of operation, and
wherein the first region and the second region are different regions from each other in the plane.

12. A boiler, comprising:
a combustion device for combusting a fuel;
an exhaust gas passage to which an exhaust gas from the combustion device is introduced; and
a flue gas denitrizer according to claim 11 including a catalyst layer disposed in the exhaust gas passage.

13. A power generation plant, comprising:
a boiler according to claim 12; and
a generator configured to be driven by steam produced by the boiler.

14. A flue gas denitrizer, comprising a catalyst layer disposed in an exhaust gas passage,
wherein the flue gas denitrizer is a second flue gas denitrizer disposed in a second combustion facility,
wherein the catalyst layer of the second denitrizer includes a first region of the catalyst layer in which a first catalyst is used and a second region of the catalyst layer in which a second catalyst different from the first catalyst is used, the first region and the second region being decided on the basis of a location dependence in a plane perpendicular to an exhaust gas flow direction in a first flue gas denitrizer disposed in a first combustion facility, of a degradation state of a catalyst in a catalyst layer of the first investigation flue gas denitrizer after a lapse of a period of operation of the first combustion facility, the first combustion facility being different from the second combustion facility, and wherein the first region and the second region are different regions from each other in a plane perpendicular to an exhaust gas flow direction in the second flue gas denitrizer.

15. A boiler, comprising:

a combustion device for combusting a fuel;

an exhaust gas passage to which an exhaust gas from the combustion device is introduced; and a flue gas denitrizer according to claim 14 including a catalyst layer disposed in the exhaust gas passage.

16. A power generation plant, comprising:

a boiler according to claim 15; and a generator configured to be driven by steam produced by the boiler.

* * * * *